United States Patent [19]

Hagen

[11] 4,112,539
[45] Sep. 12, 1978

[54] STRUCTURAL-REINFORCEMENT MEANS FOR PRECISION, TELESCOPING, LINEAR SLIDE MECHANISMS

[76] Inventor: Magnus F. Hagen, 434 Panorama Dr., Laguna Beach, Calif. 92651

[21] Appl. No.: 685,638

[22] Filed: May 12, 1976

[51] Int. Cl.² .................................................. E05D 13/02
[52] U.S. Cl. .................................. 16/88; 312/330 R; 312/341 R
[58] Field of Search ............ 16/87 R, 88; 312/341 R, 312/330 R

[56] References Cited

U.S. PATENT DOCUMENTS

| | | | |
|---|---|---|---|
| 1,045,523 | 11/1912 | Cossey | 16/88 |
| 1,106,992 | 8/1914 | Thomas | 16/88 |
| 3,275,396 | 9/1966 | Hillson et al. | 312/341 R |
| 3,901,564 | 8/1975 | Armstrong | 312/341 |

*Primary Examiner*—Werner H. Schroeder
*Assistant Examiner*—Moshe I. Cohen

*Attorney, Agent, or Firm*—J. Carroll Baisch

[57] ABSTRACT

A structural-reinforcement means for a precision, telescoping, bearing, slide mechanism having inner and outer slide members held together by ball bearings, or other well known means, such as frictional or roller bearings, the balls being operably disposed in a ball retainer between the inner and outer slide members, the outer slide member being adapted to be received and supported in an outer, elongated, structural-reinforcing bar member having a longitudinally-extending, center wall and laterally outwardly-extending, flange members integrally formed along each side of the center wall. An inner, elongated, structural bar member is arranged to be received and fixedly mounted within the inner slide member thereof, wherein each reinforcing bar member is formed from an aluminum material whereby structural strength, load-carrying capacity, and extended load-carrying capacity are established with respect to the outer and the inner slide members.

7 Claims, 4 Drawing Figures

U.S. Patent   Sept. 12, 1978   4,112,539
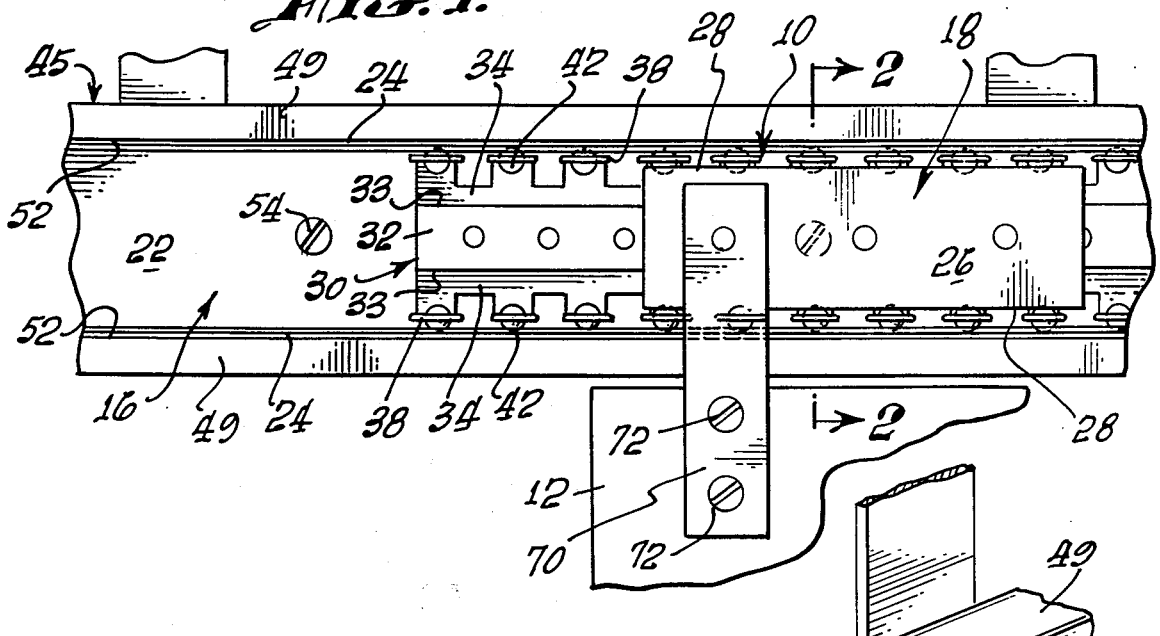
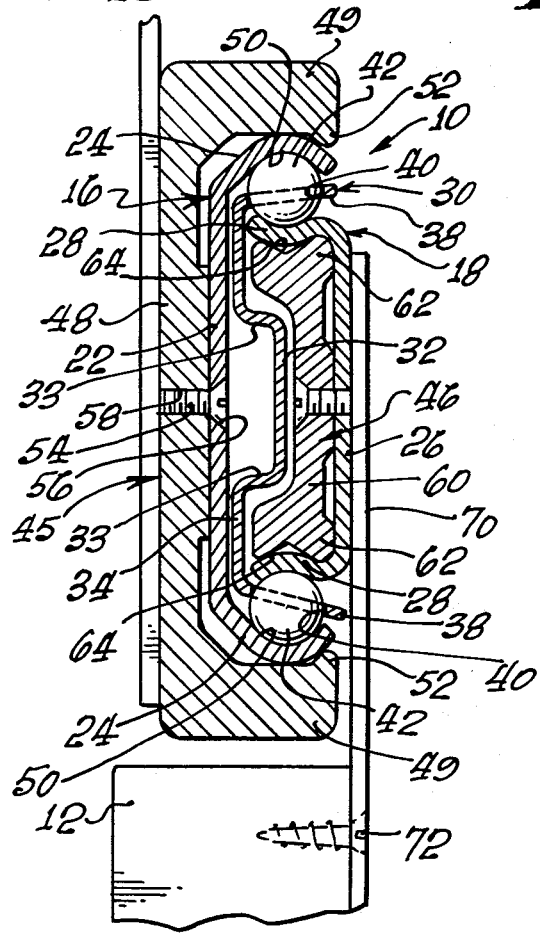
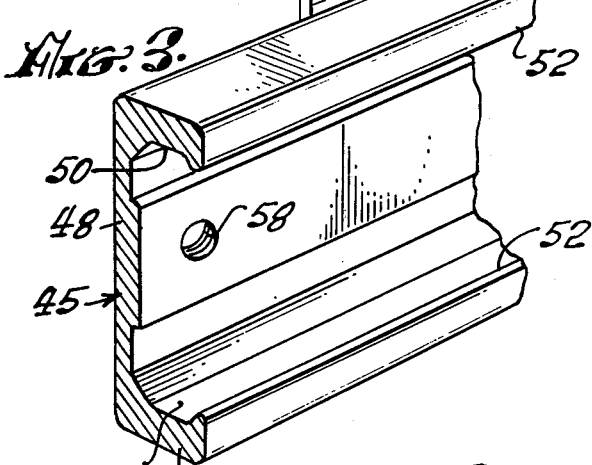

STRUCTURAL-REINFORCEMENT MEANS FOR PRECISION, TELESCOPING, LINEAR SLIDE MECHANISMS

BACKGROUND OF THE INVENTION

1. Field of the Invention

This invention relates generally to telescoping, linear, slide mechanisms, and relates more particularly to lightweight, structural-reinforcing members adapted to be associated with telescoping or linear, ball-bearing, slide mechanisms.

2. Description of the Prior Art

As is well known in the art, various types of sliding mechanisms are presently available. However, several problems and difficulties are encountered in providing the necessary structural strength and load-carrying capacity when these mechanisms are used to carry and support large moving structures such as heavy doors, partitions, electronic packaging, copying machines, door movements and appliances.

In order to meet specific design requirements relating to sliding structures as mentioned above, these mechanisms or devices must operate continuously, smoothly, and efficiently, even under difficult conditions, such as in carrying heavy-load structures which must frequently be moved from one position or location to another.

Slide devices such as those generally known to be associated with cabinet structures and the like for attachment to drawers, etc., have been found to be very useful for use with slidable, hanging doors and partitions. However, these hanging structures are of such weight and size that the average designed sliding units cannot continuously support said structures. Hence, the structural strength of the slides must be changed to allow for greater load-carrying capacity. Providing larger and heavier material would not solve the problem—it would only add to it. Changing the material of the slide members to a soft, lightweight kind such as an aluminum alloy would also present inherent wear problems, wherein the steel balls, being of harder material than the softer aluminum alloy, will gall into the soft aluminum ball raceways and/or Brinnel into the ball raceways, thereby shortening the life expectancy and eventually causing the slide to be unuseable.

Others have tried various methods of obviating the above problems—one such method being the forming of an aluminum, extruded, ball-bearing slide by inserting into the extrusion, for ball-race purposes, a thin strip of steel in order to give this extruded aluminum ball slide a long wearing characteristic, etc.

However, by inserting these thin strips of steel into the extrusion, the strip thereof is subject to loosening when the ball bearings continuously traverse back and forth thereon.

SUMMARY OF THE INVENTION

The present invention relates to a structural-reinforcement means for use in conjuction with a telescoping, ball-bearing, slide mechanism having inner and outer slide members, and a ball-retainer means between the members, with the ball-retainer means positioning the ball-bearings in operative position therebetween. The ball bearings are positioned in ball-bearing raceways of the inner and outer slide members, and hold the members in sliding relationship to each other. When the mechanism is installed, one of the slide members is stationary while the other one is movable. Usually, the outer slide member is attached to a stationary structure or member, while the inner member is secured to a movable member and, in this particular situation, the movable member can be any slidable member such as a hanging door, partition or like structure. Thus, the inner member, along with its attached structure, is capable of sliding relative to the stationary structure.

In the case where the hanging structure comprises considerable weight, there is a problem of protecting the slide members from collapse. That is, any distortion of the slide member creates an inoperative device.

This problem and others heretofore mentioned have been overcome with the inclusion of the present invention which comprises a first, outer, extruded, lightweight, metal-reinforcing, bar member. It is contemplated that a soft aluminum alloy will be employed, with the capability of being formed in accordance with very close tolerances. The outer, reinforcing, bar member is defined by a central, longitudinal wall having laterally-extending flanges integrally formed thereon, thereby forming a somewhat "C"-shaped, support structure in which the outer slide member is fixedly mounted therein. Hence, the addition of the aluminum material mass greatly reinforces the outer slide member by adding strength thereto, giving load-carrying abilities without any changes to the slide member per se.

An inner, structural, bar member is provided for the inner slide member whereby the stresses applied to the inner slide member, when attached to a hanging door or the like, do not affect the alignment of the inner slide. The inner bar is defined by an elongated, extruded member of soft aluminum alloy having a main body, each longitudinal side edge thereof being formed with enlarged, continuous, integral, truss members for positive engagement of the raceways of the inner slide member. The truss members, together with the central body portion of the inner bar, provide the necessary means by which the inner slide is held in a very rigid condition at all times.

Hence, it can be seen that, by the implementation of both the outer and inner structural bar members with their respective slide members, a sliding device is created whereby known heavy-weight structures can be slidably supported by precision-type, telescoping, ball-bearing, suspension, slide mechanisms—which has not been possible to achieve before the present invention.

However, it should be also understood that, under various requirements, the reinforcement means may consist of steel, aluminum, plastic or like materials where such materials would readily cooperate with the slide members which can also be made from the above same materials.

OBJECTS AND ADVANTAGES OF THE INVENTION

The present invention has for an important object a provision whereby a known precision-type, telescoping, ball-bearing, slide mechanism is substantially reinforced by an outer, extruded, lightweight, aluminum, bar member adapted to receive and structurally support the outer slide member and a very close-tolerance, extruded, aluminum, inner bar member wherein the inner bar member is received and mounted in the inner slide member, thereby adding structural strength, load-carrying capacity, and extended load-carrying capacity that has not been accomplished heretofore.

It is another object of the invention to provide a structural-reinforcing means for precision, telescoping, ball-bearing slides wherein there is still the long-life expectancy provided by an all-steel unit—and, in addition, the life expectancy is extended even further due to the rigid control of the slide member alignments.

It is still another object of the invention to provide a structural-reinforcing means for precision, telescoping, ball-bearing slides wherein the total steel slide is independent in all respects of the aluminum-extruded mass around it—as far as the functioning of the slide unit is concerned.

It is a further object of the present invention to provide a device of this character that includes a sound-deadening quality which can diminish, or even eliminate, the hollow sound created by rolling balls in a sheet metal box, as sometimes will occur in certain installations.

A still further object of the invention is to provide a device of this character that is capable of structurally supporting heavy loads such as doors, partitions and the like, wherein the device will allow an extremely thin profile, whereas normally a much heavier and wider arrangement is necessary to accomplish the same with rollers or other means.

It is still another object of this invention to provide a device of this character that can be simply extruded in the desired shape and wherein the lengths thereof are easily determined to accommodate a plurality of slide members therein.

It is a further object of the invention to provide a device of this character that is relatively inexpensive to manufacture.

The characteristics and advantages of the invention are further sufficiently referred to in connection with the following detailed description of the accompanying drawings, which represent one embodiment. After considering this example, skilled persons will understand that many variations may be made without departing from the principles disclosed, and I contemplate the employment of any structures, arrangements or modes of operation that are properly within the scope of the appended claims.

DESCRIPTION OF THE DRAWINGS

Referring to the drawings, which are for illustrative purposes only:

FIG. 1 is a fragmentary, plan view of the present invention incorporated with a telescoping, ball-bearing, slide unit;

FIG. 2 is an enlarged, cross-sectional view taken substantially along line 2—2 of FIG. 1;

FIG. 3 is an enlarged, fragmentary, perspective view of the outer, structural-reinforcing, bar member; and FIG. 4 is a fragmentary, perspective view of the inner, structural-reinforcing, bar member.

DESCRIPTION OF THE PREFERRED EMBODIMENT

Referring more particularly to the drawings, there is shown in FIG. 1 a slide mechanism indicated generally at 10, having attached in combination thereto the present invention of a structural-reinforcement means. It should be noted that this particular slide unit has been adapted for use with sliding doors or partitions, as designated at 12.

As is well known in this type of ball-bearing, slide mechanism, there is included a pair of slide members, an outer member indicated generally at 16, and an inner slide member indicated generally at 18. One of the slide members is attached or secured to the adjacent side of said door or movable partition 12.

Slide members 16 and 18 are generally channel-shaped and formed of sheet metal, preferably steel, by stamping, these parts being made with great accuracy.

Outer member 16 has a longitudinally-extending, center wall 22 which may be termed the bottom of the channel. Along each side edge of the bottom wall 22 there is an outwardly and laterally extending, ball raceway 24 that is concave and convex in cross-section, with a concave surface facing inwardly so that said surfaces are oppositely arranged relative to the length of the wall 22.

Inner slide member 18 also has a bottom wall, indicated at 26, along the longitudinally extending sides or side edges of which are laterally turned ball raceways 28 which are oppositely arranged and arcuate in cross-section, with the concave surfaces arranged oppositely respective adjacent ball raceways 24 of the outer slide member, said raceways 24 being spaced from said adjacent raceways 28.

Slide members 16 and 18 are arranged so that their open sides face each other and are disposed between said members. In the space between the parallel walls 22 and 26 there is a ball-retainer means, indicated generally at 30. Ball retainer 30 is also channel-shaped and has a bottom wall comprising a shallow, reverse-channel portion 32 which extends longitudinally of the retainer. The side walls 33 of the reverse-channel portion 32 connect with side parts 34 of the ball retainer; and from the outer edges of the ball retainer there extends a series of ball-retaining arms 38 spaced apart longitudinally of the ball retainer 30. The arms at one side of the ball retainer end generally are parallel to the walls 33 of the reverse-channel portion 32. The arms 38 are provided with respective aligned openings 40 for reception of ball bearings 42.

When the ball retainer is operably disposed in the slide mechanism between the inner and outer members, the balls 42 are operably positioned in the raceways 24, as best shown in FIG. 2. The sides 38 of the ball retainer may exert a slight pressure or tension on the balls against the raceways to minimize or eliminate retainer vibration and possible noise.

Thus, it can be understood that a slide mechanism as herein described is so made as to be very accurate in its structural arrangements and alignments.

Therefore, any undue strain or stress placed upon either or both slide members could possibly cause a misalignment therebetween, wherein the slide becomes inoperable. Hence, the present invention was designed to provide a simple means whereby each slide is held in a rigid, parallel relationship to the other, without causing a binding action to occur, yet conforming to the straight alignment tolerances necessary for a free-rolling operation of the hanging structure 12.

The present invention comprises a first structural, outer, support bar defining an outer reinforcing member, generally indicated at 45, which is adapted to fixedly receive and support the outer slide member 16, and a second structural member providing an inner support bar defining an inner reinforcing member, generally indicated at 46, said inner support bar 46 being formed so as to be disposed within the longitudinal channel opening of the inner slide member 18. The above-described positioned, support members 45 and 46 are readily illustrated in FIG. 2.

Each reinforcing support member 45 and 46 is formed by extrusion of a lightweight aluminum alloy, wherein said reinforcing member 45 defines an elongated channel having a central back wall 48 which could be termed the bottom of the channel. Integrally formed along each longitudinal edge of the back wall 48 there is an outwardly and laterally extending flange 49 that is provided with an elongated recess 50 having a downwardly extended lip 52. Each recess is oppositely arranged relative to the other, and is spaced apart laterally relative to the length of the back wall 48. Thus, there is provided a channel in which the outer slide member is received and fixedly supported therein. Once the slide member 16 is positioned within support structure 45, it is affixed therein in any well-known, suitable manner, such as a screw 54, seen in FIG. 2, passing through hole 56 disposed in wall 22 and threadably received in back wall 48 of bar 45, which includes a threaded hole 58.

In addition, both the bar 45 and slide 16 can be secured to the fixed wall by extending screw 54 to engage said wall. Thus, various mounting brackets could be used, thereby leaving the mounting to individual requirements.

Therefore, as seen in FIG. 2, raceways 24 engage within each recess 50, while bottom wall 22 engages the back wall 48 of bar 45, thereby preventing any misalignment or warping to occur, and at the same time very little weight being added thereto.

Inner reinforcing bar member 46 is designed to be received in the open channel of sliding member 18; and this is accomplished by forming bar 46 with a main wall 60 for direct engagement with wall 26 of slide 18, and having the leading longitudinal edges of the bar enlarged to form a continuous, elongated truss 62 for direct engagement with each oppositely disposed raceway 28. In order to permit a firm contact between the truss members 62 and the raceways 28, a concave groove 64 is provided therein, thereby allowing the truss 60 to fit within the concave/convex surface of each raceway.

Again, warping of the inner slide member 18 is prevented by the mounting of bar 46 therein. When a door 12, or partition or the like, is secured to the inner slide member 18, the load-carrying weight thereof is readily supported by the combination of the slide and bar members.

It should be noted that various mounting brackets can be adapted for use to fasten the door to said slide member 18; and, as an example, bracket 70 is shown in FIG. 1 as being affixed to the back of wall 26 of slide 18, and depending downwardly and secured to door 12 by screws 72.

The invention and its attendant advantages will be understood from the foregoing description, and it will be apparent that various changes may be made in the form, construction and arrangement of parts without departing from the spirit or scope thereof or sacrificing its material advantages, the arrangements hereinbefore described being merely by way of example, and I do not wish to be restricted to the specific form shown or uses mentioned, except as defined in accompanying claims.

I claim:

1. A structural-reinforcement means for precision, telescoping, linear, suspension slides of the type that includes:

an outer slide member having a bottom wall and inwardly-formed, ball raceways arranged along the side edges of said bottom wall in a longitudinal, parallel relationship to each other, said raceways being concave in cross-section and facing each other;

an inner slide member having a channel-shaped configuration defined by a bottom wall and oppositely disposed raceways along the side edges thereof, said ball raceways being concave in cross-section and facing outwardly, the inner slide member being operably disposed within the outer slide member;

ball bearings disposed in adjacent raceways of the respective outer and inner slide members;

a ball retainer operably positioned between the outer and inner slide members for retaining said balls in spaced relationship to each other and in said raceways;

an outer, structural-reinforcing bar having a channel-shaped cross section defined by a rear wall and outwardly-extending, flange members integrally formed along the longitudinal side edges of said rear wall, said flanges having a recess formed throughout the length thereof, wherein said outer slide member is fixedly received within said channel of said reinforcing bar, whereby said outer slide is prevented from being misaligned when a load is applied thereto; and an inner, structural-reinforcing, bar member having an elongated main wall, the longitudinal edges thereof forming a continuous truss member for direct engagement with each oppositely disposed raceway of said inner slide member, said inner reinforcing member being mounted within said channel of said inner slide member, thereby preventing distortion thereof when a load is applied thereto.

2. A structural-reinforcement means as recited in claim 1, wherein means are included for fixedly mounting said outer slide member to said outer reinforcing bar.

3. A structural-reinforcement means as recited in claim 2, wherein said flange members of said outer reinforcing bar include a depending lip member formed along the length of said flange, thereby defining said recess formed in said flange, and wherein said raceways of said outer slide member directly engage said recess, and said rear wall of said reinforcing bar directly engages said bottom wall of said outer slide member.

4. A structural-reinforcement means as recited in claim 3, wherein said truss members of said inner reinforcing bar include a longitudinal, concave groove, thereby allowing said concaved raceway of said inner slide to be received therein, whereby said raceways are held in a fixed position.

5. A structural-reinforcement means as recited in claim 4, including mounting brackets affixed to said inner sliding member, whereby a hanging structure can be secured thereto.

6. The combination of a structural-reinforcing means adapted to support a ball-bearing, slide mechanism having an outer and inner slide member, the improvement comprising:

an outer, structural-reinforcing bar having a substantially "C"-shaped channel defined by a rear wall and recessed flange members extending outwardly therefrom, said recesses being oppositely arranged and facing inwardly of said channel, said outer slide member being fixedly supported within said "C"-shaped channel and said recesses; and an inner, structural-reinforcing bar having a main wall member and truss members formed along the oppositely-disposed leading, longitudinal edges thereof, said bar being arranged to be received and mounted in said inner slide member, whereby said outer and inner bar members hold the respective slide members in a rigid, slidable alignment with each other.

7. The combination of claim 6, wherein said truss members include a longitudinal, concave groove therein.

* * * * *